(12) United States Patent
Terpsma et al.

(10) Patent No.: US 8,540,270 B2
(45) Date of Patent: Sep. 24, 2013

(54) HITCH COUPLER

(75) Inventors: Eric M. Terpsma, Holland, MI (US);
Roger L. Jansen, III, Holton, MI (US);
Richard T. Polanic, Hudsonville, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 0 days.

(21) Appl. No.: 13/554,016

(22) Filed: Jul. 20, 2012

(65) Prior Publication Data

US 2012/0299271 A1 Nov. 29, 2012

Related U.S. Application Data

(62) Division of application No. 12/827,685, filed on Jun. 30, 2010, now Pat. No. 8,336,902.

(51) Int. Cl.
*B60D 1/02* (2006.01)

(52) U.S. Cl.
USPC .......................................................... 280/515

(58) Field of Classification Search
USPC .......................................................... 280/515
See application file for complete search history.

(56) References Cited

U.S. PATENT DOCUMENTS

| 1,887,054 | A | * | 11/1932 | Wood | 280/515 |
|---|---|---|---|---|---|
| 2,140,132 | A | * | 12/1938 | Hollett | 280/492 |
| 2,478,736 | A | * | 8/1949 | Balzen | 280/477 |
| 2,525,471 | A | * | 10/1950 | Balzer | 280/508 |
| 3,046,037 | A | * | 7/1962 | Cain | 280/477 |
| 3,190,677 | A | * | 6/1965 | Robbins | 280/515 |
| 5,769,559 | A | * | 6/1998 | Olson | 403/322.1 |
| 7,398,987 | B2 | | 7/2008 | Roe et al. | |

* cited by examiner

*Primary Examiner* — Kevin Hurley
(74) *Attorney, Agent, or Firm* — Price Heneveld LLP

(57) ABSTRACT

A hitch coupler includes a frame that includes a back plate, a first plate connected to the back plate, a second plate connected to the back plate at a position spaced from the first plate extending between the first plate and the second plate and cooperating therewith to define an interior space, and a third plate connected to the back plate spaced from the second plate, wherein the first, second and third plates each include an aperture extending therethrough. The frame also includes a pin extending through the first, second and third apertures, such that the pin extends through the interior space and is adapted to slide within the apertures between an extended position and a retracted position, and a spring member biasing the pin towards the extended position.

10 Claims, 3 Drawing Sheets

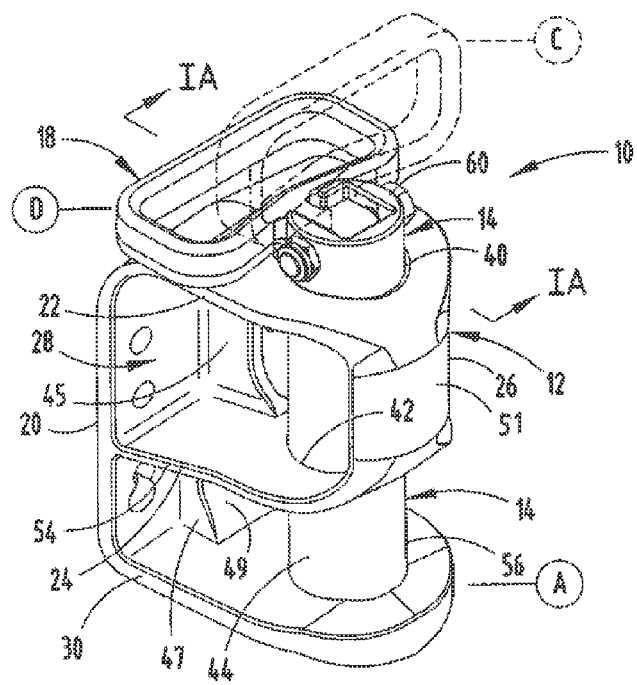
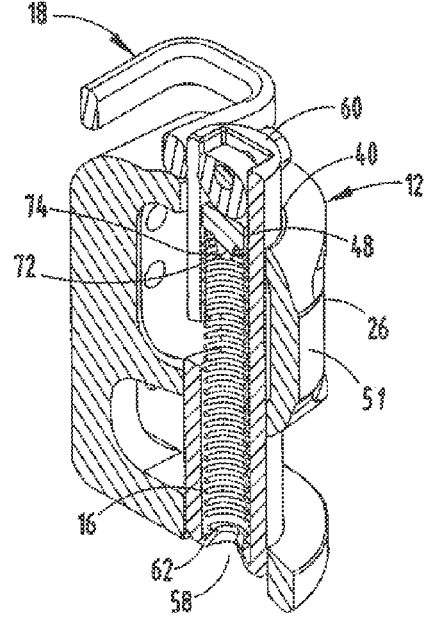
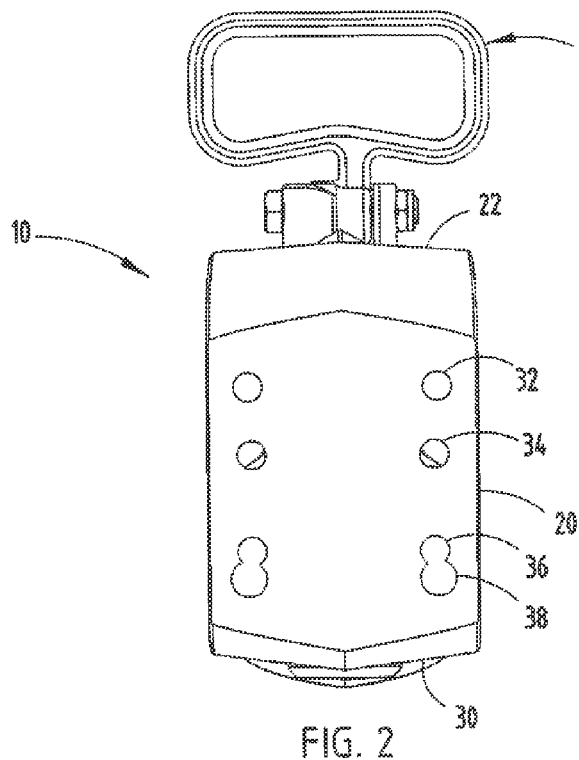

HITCH COUPLER

CROSS-REFERENCE TO RELATED APPLICATIONS

This application is a divisional of U.S. patent application Ser. No. 12/827,685, filed on Jun. 30, 2010, entitled "HITCH COUPLER," the entire disclosures of which are incorporated herein by reference.

BACKGROUND OF THE INVENTION

The present invention generally relates to a trailer hitch coupler and more particularly relates to a trailer hitch coupler of the type that includes a vertically movable pin for engaging a drawbar eye of a trailer.

SUMMARY OF THE INVENTION

One aspect of the present invention is to provide a hitch coupler that comprises a frame including a back plate, a first plate connected to and extended from the back plate, the first plate having a first aperture extending therethrough, a second plate connected to and extending from the back plate at a position spaced from the first plate, the second plate having a second aperture extending therethrough, a front plate connected to and extending between the first plate and the second plate, wherein the first plate, the second plate and the front plate cooperate to define an interior space, and a third plate connected to and extending from the back plate at a position spaced from the second plate, the third plate having a third aperture, the second and third plates cooperating to form a gap therebetween adapted to receive a drawbar therein. The hitch coupler also comprises a pin extending through the first aperture of the first plate, the second aperture of the second plate and the third aperture of the third plate such that the pin extends through the interior space, the pin adapted to slide within the first, second and third apertures between an extended position and a retracted position. The hitch coupler further comprises a spring member biasing the pin towards the extended position.

Yet another aspect of the present invention is to provide a hitch coupler that comprises a frame including a back plate, a first plate connected to and extending from the back plate, the first plate having a first aperture extending therethrough, a second plate connected to and extending from the back plate at a position spaced from the first plate, the second plate having a second aperture extending therethrough, and a third plate connected to and extending from the back plate at a position spaced from the second plate, the third plate having a third aperture, and the second and third plates cooperating to form a gap therebetween adapted to receive a drawbar therein. The hitch coupler also comprises a pin extending through the first aperture of the first plate, the second aperture of the second plate and the third aperture of the third plate, the pin adapted to slide within the first, second and third apertures between an extended position and a retracted position. The hitch coupler further comprises a spring member biasing the pin towards the extended position, and a handle member selectively coupled to an end of the pin between a first configuration, wherein the handle may be rotated with respect to a longitudinal access of the pin, and a second configuration, wherein the handle is prevented from rotating with respect to the pin.

Still yet another aspect of the present invention is to provide a hitch coupler comprising a frame including a back plate having a first pair of apertures extending through the back plate and each having a first diameter, a second pair of apertures extending through the back plate and each having a second diameter that is substantially similar to the first diameter, the second pair of apertures being spaced below and located inwardly of the first pair of apertures, a third pair of apertures extending through the back plate and each having a third diameter that is substantially similar to the first diameter, the third pair of apertures being spaced below the second pair of apertures and located inwardly of the first pair of apertures, and fourth pair of apertures extending through the back plate and each having a fourth diameter that is larger than the first diameter, the fourth pair of apertures overlapping with the third pair of apertures and aligned with the first pair of apertures. The frame further comprises a first plate connected to and extending from the back plate, the first plate having a first opening extending therethrough, a second plate connected to and extending from the back plate at a position spaced from the first plate, the second plate having a second opening extending therethrough, and a third plate connected to and extending from the back plate at a position spaced from the second plate, the third plate having a third opening, and the second and third plates cooperating to form a gap therebetween adapted to receive a drawbar therein. The hitch coupler further comprises a pin extending through the first opening of the first plate, the second opening of the second plate and the third opening of the third plate, the pin adapted to slide within the first, second and third openings between an extended position and a retracted position, and a spring member biasing the pin towards the extended position.

The principle objects of the present invention are to provide a more durable hitch coupler that may be operated by even unskilled personnel, is efficient in use, economical to manufacture, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1 is a front perspective view of a hitch coupler embodying the present invention;

FIG. 1A is a cross-sectional perspective view of the hitch coupler taken along the line IA-IA, FIG. 1;

FIG. 2 is a rear elevational view of the hitch coupler;

DETAILED DESCRIPTION OF THE PREFERRED EMBODIMENTS

Figure 3:
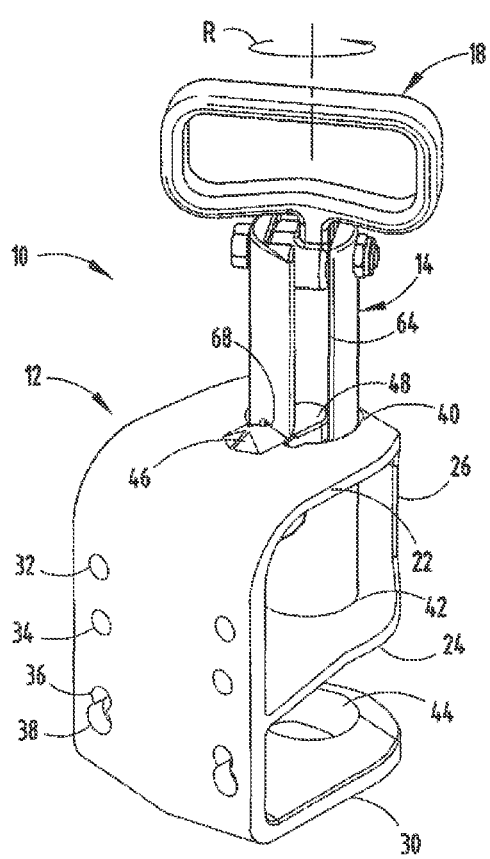
FIG. 3 is a rear perspective view of the hitch coupler.

For purposes of description herein, the terms "upper," "lower," "right," "left," "rear," "front," "vertical," "horizontal," "top," "bottom," and derivatives thereof shall relate to the invention as shown in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions, proportions, and other physical characteristics relating to the embodiment disclosed herein are not to be considered as limiting, unless the claims expressly state otherwise.

The reference numeral 10 (FIG. 1) generally designates a hitch coupler embodying the present invention. In the illustrated example, the hitch coupler includes a frame 12, a pin 14, a spring member 16 (FIG. 1A) biasing the pin 14 within the frame 12, and a handle member 18 provided so as to allow an operator to move the pin 14 within the frame 12.

Figure 4:
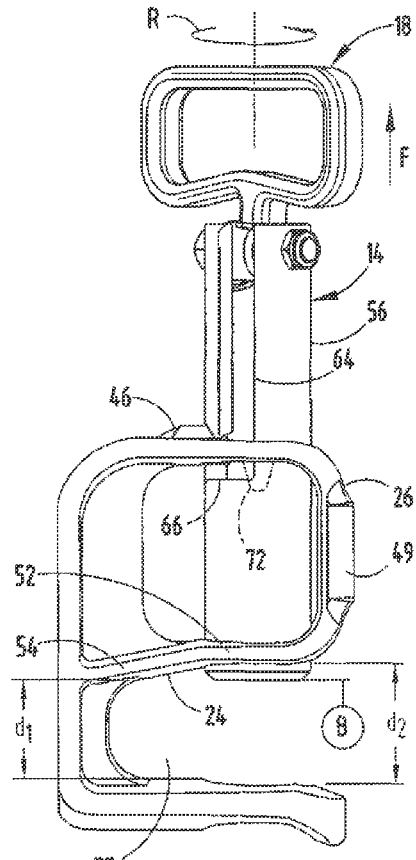
FIG. 4 is a side elevational view of the hitch coupler.

The frame 12 includes a back plate 20, a top plate 22 integrally connected to and extending from an upper portion of the back plate 20, a middle plate 24 integrally connected to an extending from the back plate 20 at a position that is spaced below the top plate 22, a front plate 26 integrally connected to and extending between distal ends of the top plate 22 and the middle plate 24, such that the top plate 22, the middle plate 24 and the front plate 26 cooperate to define an interior space 28. The frame further comprises a bottom plate 30 integrally connected to and extending from a lower portion of the back plate 20 at a position spaced below the middle plate 24. As best illustrated in FIG. 2, the back plate 20 includes a plurality of apertures adapted to receive mechanical mounting hardware therein, such as bolts (not shown) for securing the overall hitch coupler 10 to an associated towing vehicle. The apertures include a first pair of apertures 32 extending through the back plate 20 and each having a first diameter, a second pair of apertures 34 extending through the back plate 20 and each having a second diameter that is substantially similar to the first diameter, the second pair of apertures 34 being spaced below and located inwardly of the first pair of apertures 32, a third pair of apertures 36 extending through the back plate 20 and each having a third diameter that is substantially similar to the first diameter, the third pair of apertures 36 being spaced below the second pair of apertures 34 and located inwardly of the first pair of apertures 32, and a fourth pair of apertures 38 extending through the back plate 20 and each having a fourth diameter that is larger than the first diameter, the fourth pair of apertures 38 overlapping the third pair of apertures 36 and aligned with the first pair of apertures 32. The present inventive bolt patterning creates a universal hitch arrangement allowing the hitch coupler 10 to be utilized with vehicles or other hitches patterned for PH30 or E-hitch type assemblies. The top plate 22 includes an aperture 40, the middle plate 24 an aperture 42, and the bottom plate 30 an aperture 44 each adapted to slidably receive the pin 14 therethrough. The top plate 22 (FIG. 3) includes a prismatic protrusion 46 extending upwardly therefrom, and a guide member 48 extending into the aperture 40. The protrusion 46 is adapted to secure the pin 14 in a retracted position, while the guide member 48 is adapted to guide the pin 14 as the pin 14 is moved between the retracted position and an extended position, each as described below. The front plate 26 includes a rounded or arcuately-shaped outer surface 51 that extends outwardly from an outermost portion of the bottom plate 30, and is adapted to deflect the collision of a cooperating drawbar assembly, thereby protecting the pin 14, the spring 16, the handle member 18, and other components from damage. The middle plate 24 (FIG. 4) includes an upper portion 52 and a downwardly angled lower portion 54, such that the distance $d_1$, as defined between the proximal ends of the middle plate 24 and the bottom plate 30, is less than the distance $d_2$, as defined between the distal ends of the middle plate 24 and the bottom plate 30, thereby forcing a coupled portion of a drawbar into a particular, more restricted location within the gap 55 created between the middle plate 24 and the bottom plate 30. This restricted movement of the drawbar with respect to the hitch coupler 10 provides increased control of the towed vehicle/trailer and reduces the wear of associated components. A structural reinforcement rib 45 extends forwardly from the back plate 20 and vertically between the top plate 22 and the middle plate 24. A second reinforcement rib 47 extends forwardly from the back plate 20 and vertically between the middle plate 24 and the bottom plate 30. A forwardly facing surface 49 is provided an arcuate shape having a radius substantially similar to the radius of a coupled portion of a trailer drawbar, thereby limiting movement between the hitch coupler 10 and the drawbar, also resulting in better control of the towed vehicle/trailer and less wear to associated components.

The pin 14 includes a cylindrical housing 56 which defines an interior space 58. The pin 14 includes an opening top end 60 and an open bottom end 62, thereby allowing water and debris to drain from the interior space 58. The housing 56 of the pin 14 includes a longitudinally extending slot 64 extending from the top end 60 to a position along the length of the housing 56. The bottom end of the slot 64 ends in a circumferentially extending slot 66 having a triangularly-shaped surface 68 adapted to receive the protrusion 46 of the frame 12 therein.

Figure 4A:
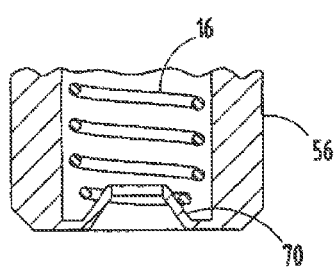
FIG. 4A is an enlarged elevational side view of an area IV A, FIG. 4, illustrating a first embodiment of a pin assembly.
Figure 4B:
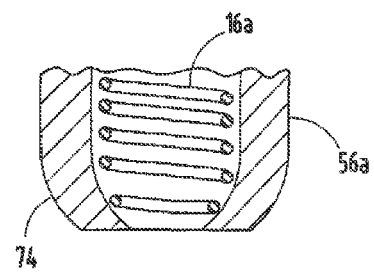
FIG. 4B is an enlarged elevational side view of an area IV A, FIG. 4, illustrating a second embodiment of a pin assembly.

As best illustrated in FIGS. 1 and 4A, a first embodiment of the spring member 16 includes a cylindrically shaped coil spring seated about a lower boss 70 formed in a lower end of the housing 56 and a upper boss 72 extending downwardly from and integrally formed into a lower surface 74 of the top plate 22. Alternatively, the spring member 16 may include a conically-shaped coil spring 16A (FIG. 4B) which is self-centering within the pin 14 and the tapered ends 74 thereof.

In operation, an operator moves the pin 14 between an extended position A (FIG. 1) and a retracted position B (FIG. 4) by grasping the handle 18 and applying an upward force F thereby overcoming the downwardly directed biasing force exerted by the spring member 16 onto the pin 14. The pin 14 is guided along its linear path by the guide member 48 slidably guiding within the slot 64 of the housing 56. The pin 14 maybe secured in the retracted position B by applying a rotational force R to the handle 18, thereby turning the pin 14 within the aperture 40 until the upper surface 68 of the slot 66 of the housing 56 is vertically aligned with the protrusion 46 of the frame 12. The operator then releases the upward force F being exerted on the handle 18, thereby allowing the spring member 16 to force the pin 14 downwardly with respect to the frame 12 and bias the protrusion 46 into the upper surface 68 of the slot 66. The engagement of the upper surface 68 with the guide member 48 holds the pin 14 in the retracted position B, thereby allowing an operator to position a drawbar within the gap 55 of the frame 12 without physically holding the pin 14 in the retracted position B. This positive engagement further prevents the pin 14 from being bumped or accidentally jarred into the extended position A by requiring the operator to again exert a force F to the pin 14 via the handle 18, apply a rotational force to the pin 14 to align the guide member 48 with the slot 64, and again release the force F thereby allowing the spring 16 to bias the pin 14 into the extended position A. It is noted that the protrusion 46 may be provided other cross-sectional configurations that provide the positive engagement as discussed above.

Figure 5A:
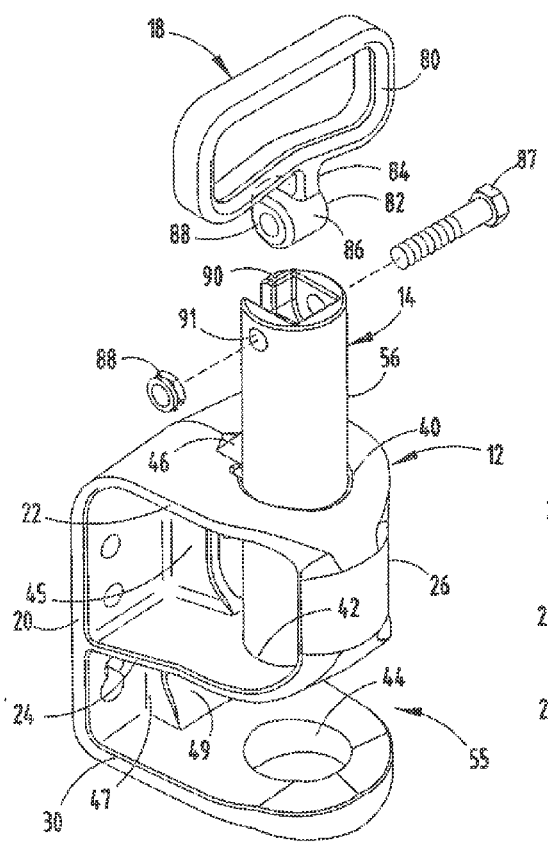
FIG. 5A is an exploded, rear perspective view of the hitch coupler.
Figure 5B:
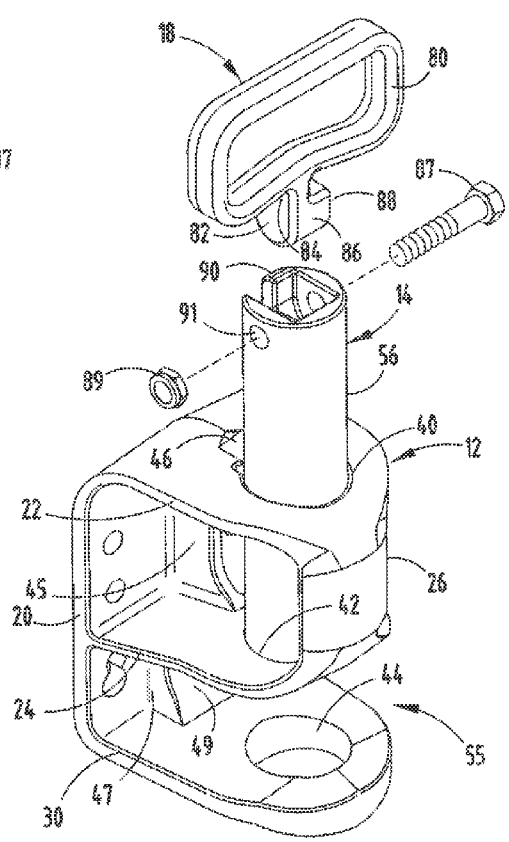
FIG. 5B is an exploded, front perspective view of the hitch coupler.

The handle member 18 (FIG. 5) includes a loop-shaped grasping portion 80 and an attachment portion 82 integrally formed with and extending outwardly from the grasping portion 80. The attachment portion 82 includes a narrowed neck 84 and an enlarged base 86 that is received into the open end 60 of the housing 56 of the pin 14 and pivotally secured thereto by a bolt 87 and nut 89 combination extending through a pair of apertures 91 of the pin 14. The base 86 includes a stop member 88 extending asymmetrically from the neck 84. In assembly, the handle member 18 may be assembled with the pin 14 in a first configuration, wherein the stop member 88 of the handle member 18 is aligned with the slot 64 of the housing 56 of the pin 14, thereby providing clearance for the stop member 88 and allowing the handle member 18 to be rotated from an in use position C to a storage position D. The handle member 18 may also be attached to the pin 14 in a second configuration, wherein the stop member 88 (FIG. 5B) with a portion 90 of the pin 14, thereby preventing the handle from being rotated from the in use position C to the storage position D.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A hitch coupler, comprising:
a frame, comprising:
a back plate;
a first plate connected to and extending from the back plate, the first plate having a first aperture extending therethough;
a second plate connected to and extending from the back plate at a position spaced from the first plate, the second plate having a second aperture extending therethrough;
a front plate connected to and extending between the first plate and the second plate, wherein the first plate, the second plate and the front plate cooperate to define an interior space; and
a third plate connected to and extending from the back plate at a position spaced from the second plate, the third plate having a third aperture, the second and third plates cooperating to form a gap therebetween adapted to receive a drawbar therein;
   a pin extending through the first aperture of the first plate, the second aperture of the second plate and the third aperture of the third plate such that the pin extends through the interior space, the pin adapted to slide within the first, second and third apertures between an extended position and a retracted position; and
   a spring member biasing the pin towards the extended position.

2. The hitch coupler of claim 1, wherein the front plate includes a rounded outward facing surface.

3. The hitch couple of claim 2, wherein the first plate and the second plate each include a rounded outward facing edge.

4. The hitch coupler of claim 1, wherein the second plate and the third plate each include a proximal end and a distal end, and wherein a distance between the proximal end of the second plate and the proximal end of the third plate is less than a distance between the distal end of the second plate and the distal end of the third plate.

5. The hitch coupler of claim 1, further including:
   a rib member located within the gap and extending between the second and third plate members, the rib member having an outward facing surface adapted to abut a drawbar and being radiused to substantially match a radius of a drawbar.

6. The hitch coupler of claim 1, wherein the front plate includes an outwardly facing surface that extends outward of an outermost portion of the third plate.

7. A hitch coupler, comprising:
a frame, comprising:
a back plate;
a first plate connected to and extending from the back plate, the first plate having a first aperture extending therethough;
a second plate connected to and extending from the back plate at a position spaced from the first plate, the second plate having a second aperture extending therethrough; and
a third plate connected to and extending from the back plate at a position spaced from the second plate, the third plate having a third aperture, the second and third plates cooperating to form a gap therebetween adapted to receive a drawbar therein;
   a pin extending through the first aperture of the first plate, the second aperture of the second plate and the third aperture of the third plate, the pin adapted to slide within the first, second and third apertures between an extended position and a retracted position;
   a spring member biasing the pin towards the extended position; and
   a handle member selectively coupled to an end of the pin between a first configuration, wherein the handle may be rotated with respect to a longitudinal axis of the pin, and a second configuration, wherein the handle is prevented from rotating with respect to the pin, the handle member includes a stop member that abuts a portion of the pin when the handle member is coupled to the pin in the first configuration, and wherein the stop member is free to rotate with respect to the pin when the handle is coupled to the pin in the second configuration.

8. The hitch coupler of claim 7, wherein pin has a hollow interior space that receives a portion of the handle member therein, the pin includes a relief, and wherein the handle includes a stop member that is rotationally aligned with the relief when the handle is in the first configuration, thereby allowing the handle member to rotate with the pin, and wherein the stop member is rotationally out of alignment with relief when the handle is in the second position, thereby preventing rotation of the handle member with respect to the pin.

9. The hitch coupler of claim 8, wherein the handle member is coupled to the pin by a bolt and nut.

10. A hitch coupler, comprising:
a frame, comprising:
a back plate having a first pair of apertures extending through the back plate and each having a first diameter, a second pair of apertures extending through the back plate and each having a second diameter that is substantial similar to the first diameter, the second pair of apertures being spaced below and located inwardly of the first pair of apertures, a third pair of apertures extending through the back plate and each having a third diameter that is substantially similar to the first diameter, the third pair of apertures being spaced below the second pair of apertures and located inwardly of the first pair of apertures, and a fourth pair of apertures extending through the back plate and each having a fourth diameter that is larger than the first diameter, the fourth pair of apertures overlapping with the third pair of apertures and aligned with the first pair of apertures;
a first plate connected to and extending from the back plate, the first plate having a first opening extending therethough;
a second plate connected to and extending from the back plate at a position spaced from the first plate, the second plate having a second opening extending therethrough; and
a third plate connected to and extending from the back plate at a position spaced from the second plate, the third plate having a third opening, the second and third plates cooperating to form a gap therebetween adapted to receive a drawbar therein;

a pin extending through the first opening of the first plate, the second opening of the second plate and the third opening of the third plate, the pin adapted to slide within the first, second and third openings, between an extended position and a retracted position; and a spring member biasing the pin towards the extended position.

* * * * *